W. SPLITTGERBER.
BALING PRESS.
APPLICATION FILED JULY 11, 1911.
1,020,626.
Patented Mar. 19, 1912.
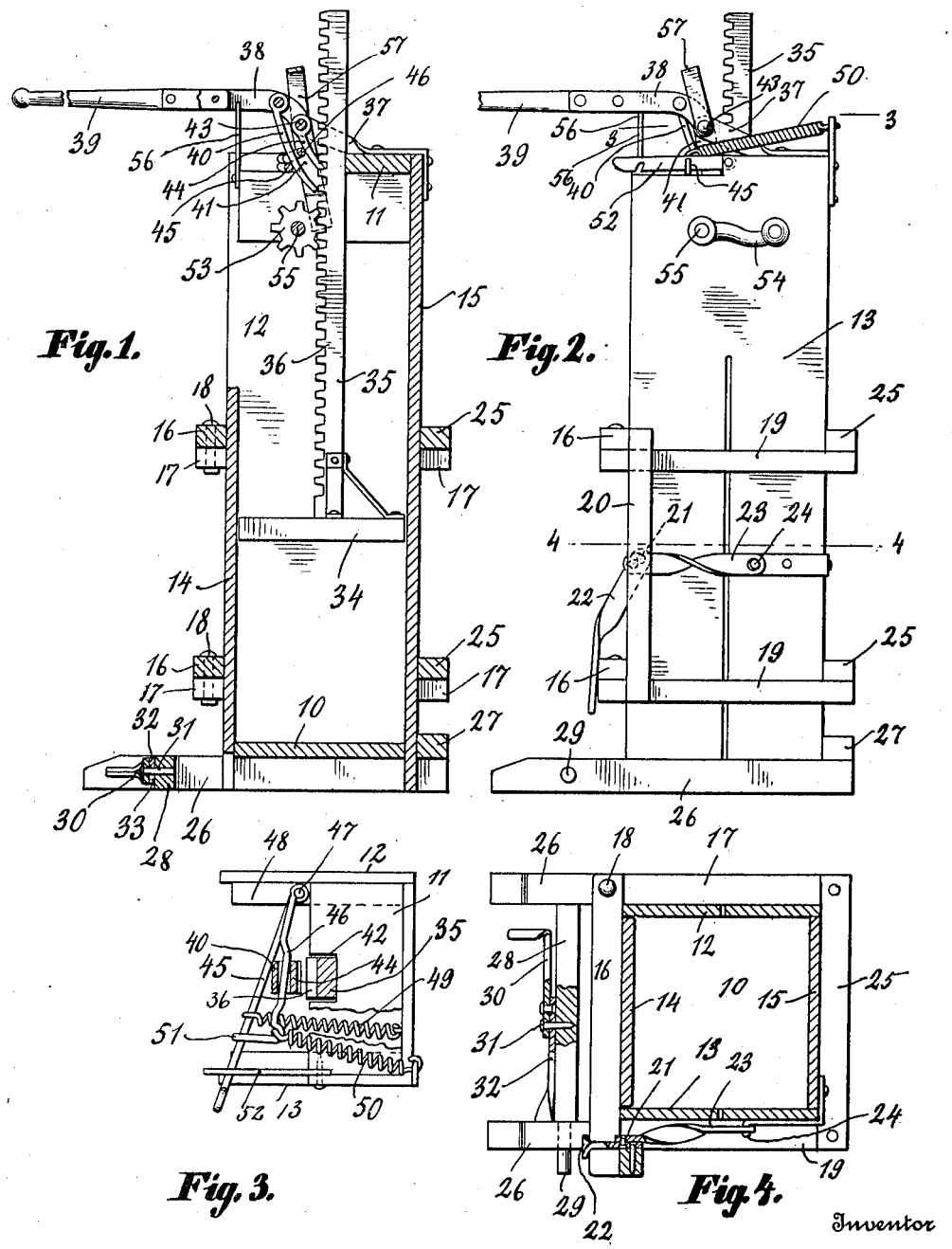

UNITED STATES PATENT OFFICE.

WILHELM SPLITTGERBER, OF CLINTONVILLE, WISCONSIN, ASSIGNOR TO CLINTONVILLE BALER COMPANY, OF CLINTONVILLE, WISCONSIN, A CORPORATION OF WISCONSIN.

BALING-PRESS.

1,020,626.  Specification of Letters Patent.  Patented Mar. 19, 1912.

Application filed July 11, 1911. Serial No. 638,003.

*To all whom it may concern:*

Be it known that I, WILHELM SPLITTGERBER, a citizen of the United States, residing at Clintonville, in the county of Waupaca and State of Wisconsin, have invented certain new and useful Improvements in Baling-Presses, of which the following is a specification.

This invention relates to that class of baling presses in which the plunger is operated by means of a ratchet-lever associated with a rack on the plunger stem.

It is the object of the invention to provide improved plunger operating means of the kind stated, together with a novel construction and arrangement of parts to be hereinafter described and claimed.

The invention also has for its object to provide a baling press which can be easily operated, and swung open to release the bale.

In order that the invention may be better understood, reference is had to the accompanying drawing forming a part of this specification, in which drawing—

Figure 1 is a central vertical section of the press. Fig. 2 is a side elevation thereof. Fig. 3 is a horizontal section on the line 3—3 of Fig. 2. Fig. 4 is a horiztontal section on the line 4—4 of Fig. 2.

Referring specifically to the drawing, the bottom of the press box is indicated at 10, the top at 11, the side walls at 12 and 13, respectively, the front wall at 14, and the rear wall at 15. The box is arranged in a vertical position, and the front wall does not extend to the top, in order to leave an open space through which the material to be compressed is introduced into the box.

The front wall 14 is hinged to the side wall 12 so that it may be swung open to release the bale. To the outside of the front wall are secured horizontal cross bars 16 which extend beyond the ends of said wall. To the side wall 12, on the outside thereof, are secured cross bars 17, which project forwardly sufficiently to permit pivotal connection with the cross bars 16, as indicated at 18, whereby the hinge connection of the front wall is had. The side wall 13 is also provided with cross bars 19 which project forwardly, and across the projecting ends of which extend the correspondingly projecting ends of the cross bars 16, the latter being connected by a vertical bar 20. To the bar 20 is pivoted, as indicated at 21, a lever 22, to which lever is pivotally connected eccentrically, a link 23 provided with an eye at its outer end. On the side wall 13 is a stud 24 which is adapted to enter the eye of the link 23, so that when the lever 22 is swung downwardly, the front wall 14 will be drawn tightly closed and locked in this position. To release the front wall 14 it is necessary only to swing the lever 22 upwardly, which loosens the link 23 sufficiently to enable it to be slipped off the stud 24, after which the wall can be swung open. The rear ends of the cross bars 17 and 19 are connected by cross bars 25 extending behind the rear wall 15.

The side walls 12 and 13 are secured at their lower ends to sills 26 which are connected at their rear ends by a cross bar 27. The sills are also connected in front by a cross bar 28, one end of which is reduced to form a tenon 29 which extends loosely through an opening through the sill on that side of the box. The last mentioned sill and the side wall 13 are sufficiently loose so that said wall may be forced outwardly to facilitate the release of the bale. This is effected by means of a lever 30 pivoted to the cross bar 28, as indicated at 31, and connected by a link 32 to the sill through which the tenon 29 passes. Upon swinging the lever in one direction, the sill and the wall are forced outwardly, thus spreading the lower portion of the box sufficiently to release the bale. When the lever is swung in the other direction, the parts are drawn inwardly and the box is contracted. The parts are locked in the last mentioned position by swinging the lever until the pivot 30 engages the notch 33 in the lower edge of the link 32. In order that the box may be spread and contracted as herein described, the bottom 10 is not made fast to the side wall 13.

In the box works a reciprocating plunger 34, for forming the bale by compressing the material in the box. The plunger has a stem 35 which is provided with a rack 36. To the top of the box are secured two upstanding brackets 37, between which are fulcrumed the forked ends 38 of a hand lever 39, said ends of the lever carrying a pivoted pawl 40 which is adapted to engage the rack 36 to operate the plunger. To the outer ends of the brackets are connected braces 41, which extend into the box and are secured to the side walls thereof. The top 11 of the box does not extend entirely across the same, so that an open space is left in front to permit operation of the lever 39. The front edge of the top 11 has a recess 42 in which the plunger stem 35 is guided.

The fulcrum of the lever 39 is a pin 43 extending between the brackets 37, and on this pin is also pivoted a detent 44 which engages the rack and locks the same when the lever 39 is swung upwardly for a new stroke. The pawl 40 and detent 44 are held yieldingly in engagement with the rack 36 by rods 45 and 46, respectively, said rods being pivoted at 47 to a block 48 secured to the side wall 12 on the inside of the box. To the other ends of the rods are connected springs 49 and 50, respectively. The rods are adapted to engage the pawl and detent, and through the springs, said pawl and detent are yieldingly held in engagement with the rack. That portion of the rod 46 which engages the detent is offset so as to clear the pawl. On the free end of the rod 46 to which the spring 50 is connected, is a hook 51 which engages the rod 45. When the plunger 34 is to be elevated, the pawl 40 and detent 44 will be placed in inoperative position, which is done by swinging the rods 45 and 46 outwardly, so as to permit the pawl and detent to drop away out of engagement with the rack 36. A latch 52 is provided for holding the rods in this position, said latch engaging the rod 45. By reason of the connection of the rod 46 with the rod 45, the former will swing outwardly with the latter.

For the purpose of elevating the plunger 34, there is provided a pinion 53 which is in mesh with the rack 36 and is operated by a crank handle 54. The shaft 55 of the pinion is journaled in the side walls of the box, and one end of said shaft projects from the wall 13 and is fitted with the crank handle.

To the block 48 is pivoted a prop 56 for holding the lever 39 elevated when the plunger is being elevated by the crank handle 54. To the pin 43 is pivoted a yoke 57 which is adapted to be swung over into engagement with the rack 36 when the plunger is in elevated position, in order to lock the latter in this position when the material is being introduced into the press box.

In operation the plunger is lowered in the press box by oscillating the hand lever 39. On the downward swing of said lever the pawl 40 engages the rack 36 whereby the plunger is pushed downwardly. On the upward swing of the lever the pawl lets go of the rack, and the detent 44 prevents the plunger from slipping upwardly, said detent slipping from the teeth of the rack as the plunger is traveling downwardly. The finished bale is removed from the box by opening the door 14 and spreading the lower end of the box as before described.

I claim:

1. In a baling press, a press box, sills on which said box is mounted, one of said sills and the wall of the box connected thereto being loose, a cross bar connecting the sills, said cross bar having a tenon passing loosely through the loose sill, a lever pivoted to the cross bar, and a connection between the lever and the loose sill.

2. In a baling press, a press box, a reciprocatory plunger working therein, a stem on the plunger, a rack on the plunger stem, a lever, a pivoted pawl carried by the lever and engageable with the rack, a detent engageable with the rack, pivoted rods engageable respectively with the pawl and detent, and springs connected to the free ends of the rods.

3. In a baling press, a press box, a reciprocatory plunger working therein, a stem on the plunger, a rack on the plunger stem, a lever, a pivoted pawl carried by the lever and engageable with the rack, a detent engageable with the rack, pivoted rods engageable respectively with the pawl and detent, a connection between the rods, and springs connected to the free ends of the rods.

In testimony whereof I affix my signature in presence of two witnesses.

WILHELM SPLITTGERBER.

Witnesses:
HERMAN F. SCHENK,
HERMAN. C. SPEARBRAKER.

---

Copies of this patent may be obtained for five cents each, by addressing the "Commissioner of Patents, Washington, D. C."